March 28, 1933. C. B. GRAY 1,903,234
CUTTING MACHINE
Filed Sept. 30, 1930 2 Sheets-Sheet 1
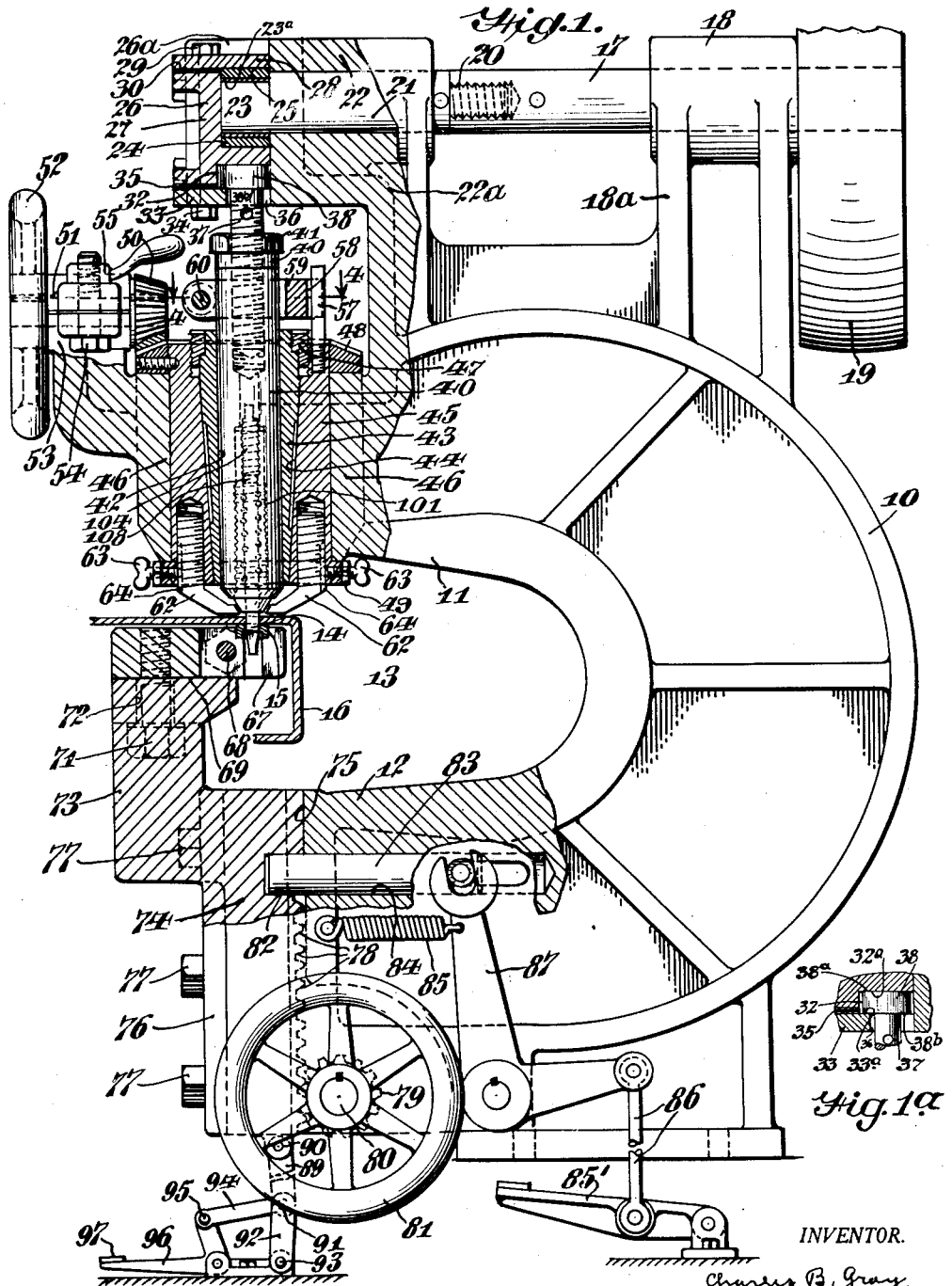
INVENTOR.
Charles B. Gray.
BY
a. B. Reavis
ATTORNEY.

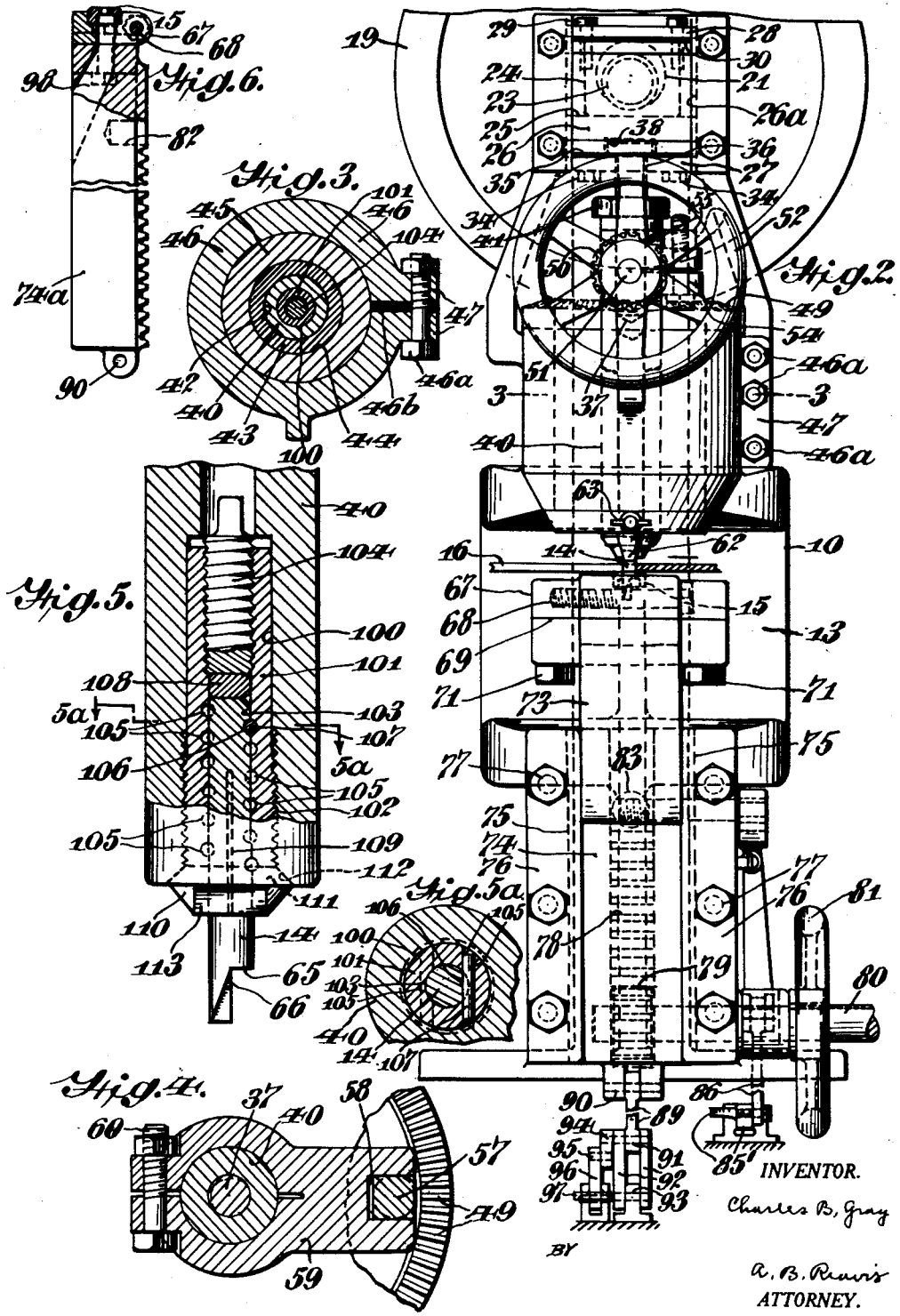

Patented Mar. 28, 1933

1,903,234

UNITED STATES PATENT OFFICE

CHARLES B. GRAY, OF MILLBOURNE, PENNSYLVANIA

CUTTING MACHINE

Application filed September 30, 1930. Serial No. 485,443.

My invention relates to cutting or slotting machines of the punch type and it has for an object to provide a machine capable of handling a variety of formed shapes.

More particularly, my improvements pertain to a cutting or slotting machine of the nibbling type employing a cooperating reciprocatory tool and die, the tool having a cutting edge and pilot and the pilot serving to limit the extent of feed between cutting strokes. It is the usual practice to have the die arranged below the tool and carried by a fixed, table-like support, and the tool is arranged to be raised above the die to permit the insertion and removal of work when making inside cuts. While such a machine is satisfactory in handling flat work, irregular shapes cannot be accommodated. In accordance with my invention, I provide a die which may be raised to normal position cooperative with the tool or lowered to permit the insertion and removal of material, and the movable support may readily have such a design and the movement be sufficiently great to accommodate a variety of shapes, channeled, flanged or flat. Since the tool is not lifted and lowered to permit the insertion and removal of work, the design thereof may be simplified, and a stronger tool construction may be provided. Therefore, a further object of my invention is to provide a machine having these advantageous features of construction.

A further object of my invention is to provide a guide construction including a turret or head for the tool-carrying ram and carried by a bearing, which extends for a substantial portion of the length of the ram and which is connected for its full length to the frame in order to steadily support the guide construction, ram and tool.

A further object of my invention is to provide an angularly adjustable ram-carrying turret or head with novel means of support and adjustment.

A further object of my invention is to provide a turret or head of the aforesaid character having arranged thereabove a slidable key connection with the ram to cause the ram and tool to turn with the head or turret, this location of the slidable key connection making possible the location of the lower end of the ram and the tool closely adjacent to the lower end of the head to strongly support the tool in operation.

A further object of my invention is to provide for a strong and steady ram support and ram driving mechanism wherein all looseness may be taken up.

A further object of my invention is to provide an eccentric drive for the ram with improved means facilitating the change of eccentrics.

A further object of my invention is to provide a ram whose tool-carrying end is arranged quite close to the guide construction for the ram together with means for connecting the tool to the ram and which does not interfere with the guide construction in order that the distance of the cutting portion of the tool from the guide construction may be kept at a minimum.

A further object of my invention is to guide the ram and to connect the tool thereto in such way that alignment of the tool and die will be maintained in operation of the machine.

These and other objects are effected by my invention, as will be apparent from the following description and claims taken in connection with the accompanying drawings, forming a part of this application, in which:

Fig. 1 is a view partly in side elevation and partly in section of my improved machine;

Fig. 1a is a detail view of the ram swivel;

Fig. 2 is a front elevation of the apparatus shown in Fig. 1;

Fig. 3 is a sectional view taken along the line 3—3 of Fig. 2;

Fig. 4 is a sectional view taken along the line 4—4 of Fig. 1;

Fig. 5 is a detail view of the ram, tool holder and tool construction;

Fig. 5a is a sectional view taken along the line 5a—5a of Fig. 5; and,

Fig. 6 is a detail view showing a modified form of die supporting slide.

Referring now to the drawings more in detail, I show a machine frame 10, preferably C-shaped, having upper and lower arms 11 and 12, respectively, between which there is the usual throat space 13. The upper arm 11 carries the reciprocatory tool 14 cooperating with the die 15 carried by the lower arm 12, the upper and lower arms being spaced apart sufficiently and the supporting structure for the die having such a design that a blank of irregular section, for example, the blank 16 of Fig. 1, may be accommodated. The machine incorporates novel drive, constructional, tool and die supporting, and adjustment features which will now be described.

The power shaft section 17 is supported by a bearing 18 carried by a bracket 18a, preferably integral with the upper arm 11, and it is driven by the pulley 19. The shaft section 17 is connected by a coupling 20 to the shaft section 21 supported by the bearing 22 carried by the bracket 22a, also preferably integral with the upper arm.

The shaft section 21 is provided with an eccentric 23 fitting the bearing 23a provided in block 24 arranged to move horizontally in the groove 25 provided in the slide 26 carried by the vertical guideway formed preferably in the bearing and bracket structure 22 and 22a. A desired throw of eccentric may be had by changing shaft sections 21, disconnection of the coupling 20 being readily effected as it is accessibly located between the bearing brackets.

The slide 26 consists of a body part 27 formed to provide one side surface and the bottom surface of the horizontal groove 25 and a plate part 28 providing the other side surface of the groove. The plate is secured to the body part by screws 29 and shims 30 are interposed to the desired thickness to provide a good slide bearing fit of the block 24 in the groove 25 without looseness.

The body part 27 is provided with a swivel recess 32 covered by the plate 33, the latter being connected to the body part by screws or bolts 34 and shims 35 being interposed to obtain the desired spacing of the swivel recess abutment surfaces 32a and 33a. The plate 33 has a U-shaped opening 36 engaging about the shank of the ram screw 37 so that the head 38 of the latter is held in the recess with the upper and lower surfaces 38a and 38b in abutting relation with respect to the surfaces 32a and 33a.

The screw 37 is threaded to the ram 40 so that the ram may be adjusted up and down relatively to the screw, and a jam nut 41 holds these parts in adjusted position.

The ram 40 fits the bore 42 in the conical, split bushing 43 fitting the conical seat 44 in the angularly adjustable turret or head 45 carried by the bearing 46, the turret or head and the bushing constituting an angularly adjustable guide construction for the ram. The bearing 46 is connected for its full length to the upper arm 11 and which, together with the bushing 43, extend for most of the length of the ram, whereby the bearing is strong and steady and the ram is adequately supported to resist forces tending to deflect or shift it laterally. The bearing 46 is split (Fig. 3) and connected by bolts 46a with interposed shims 46b so that all looseness of the head or turret 45 relative to the bearing may be removed, and the head or turret maintained centered. A ring nut 47 is threaded to the turret or head and it abuts the upper end of the bushing 43 to secure a proper fit of the latter relative to the ram.

The turret or head 45 is connected by a slidable key arrangement to the ram and it is adjustable angularly about its vertical axis to bring the ram and its tool into a desired position. The adjustment mechanism comprises the bevel gear 48 connected to the head or turret and cooperates with the collar or flange 49 to hold the head or turret in position axially, the gear meshing with the pinion 50 on the pinion shaft 51 provided with a hand wheel 52. The pinion shaft 51 is supported by the split bearing 53 supported by the upper arm 11, and the bearing is tightened to grip the shaft 51 or loosened to allow the latter to turn by the bolt 54 and the wing nut 55. After loosening the nut 55, the shaft 51 may be turned; and, in case the machine is operated with the bearing 53 loosened, the turret or head may be held or turned by controlling the hand wheel 52 in making cuts in various directions, any backlash in the gearing being avoided by pushing the pinion 50 to obtain closer or tighter mesh with the bevel gear 49.

The slidable key connection between the turret or head and the ram includes preferably a pin or projection 57 extending upwardly from the head or turret and fitting the opening 58 in the yoke or arm 59 clamped to the ram 40 by the bolt 60. Not only does this construction avoid any complication in the vicinity of the tool end of the ram, but, owing to the large radius of the connection, any looseness thereof results in reduction of possible relative angular movement of the ram with respect to the head or turret and the arm may be clamped in any desired position angularly with respect to the ram, providing for relative angular adjustment of the ram with respect to the head or turret so that the tool may be properly positioned relatively to the strippers 62 threaded into the lower end of the head or turret and being locked in position by the screws 63 engaging the key ways 64.

From Fig. 1, it will be seen that the angularly movable member or turret 45 is provided with a pair of strippers 62, as just described; and these strippers are arranged at opposite sides of the tool 14 so as to expose the front of the tool and not obscure the cutting action. If a templet is used, the stripper at the templet side of the tool is adjusted upwardly so as to be in stripping relation with respect to the top surface of the templet, the other stripper remaining in stripping relation to the stock. Hence, I provide strippers effective at either side of the tool and which move angularly with the tool in order to strip effectively and not obscure the cutting action, the strippers being adjustable to suit the thickness of stock, or of stock and a templet should a templet be used.

The tool 14 (Fig. 5) preferably has a cutting surface or edge 65 and a pilot 66. The die 15 is preferably held by a split holder and work support 67 connected by the bolt 68 and the holder is secured to a seat 69 on a suitable support by bolts 71 connected to the holder and work support and having their shanks fitting in somewhat larger openings 72 in the support to provide for lateral movement of the holder in lining up the die. As shown in Fig. 1, if the nature of the blank should require it, the support has an offset or overhanging die supporting portion 73 connected to a vertical slide 74 fitting the vertical guide 75 provided in the lower portion of the frame 10. The slide is held in place by strips 76 and bolts 77.

The die-supporting slide 74 is movable, upwardly to bring the die into cooperation with the tool and downwardly to clear the tool, by any suitable means; however, the means should be quick-acting to facilitate the handling of work. To this end, I provide the slide with rack teeth 78 meshing with the pinion 79 carried by the shaft 80 to which is preferably splined a hand wheel 81 for raising and lowering the slide. As shown in Fig. 2, the shaft 80 may extend out so that the hand wheel 81 may be slid therealong to the most accessible position. The slide has a bolt opening 82 arranged to receive a bolt 83 carried by the guide 84 provided in the lower arm 12 of the frame to lock the slide in its uppermost, or cooperative, position. A spring 85 biases the bolt 83 to snap into the opening 82 as soon as the slide is raised sufficiently to register the opening 82 with the bolt 83. The bolt is retracted by mechanism including the treadle 85' connected by the link 86 to the bell crank 87 engaging the bolt, one end of the spring 85 being attached to the bell crank. Upon retraction of the bolt, the die and slide may be lowered by turning the hand wheel in one direction, and, after lowering, the die and slide may be raised by turning the hand wheel in the other direction until the bolt 83 locks the slide.

If the required traverse of the slide 74 is limited, for example, with flat work, the toggle mechanism shown secures quicker action than the rack and pinion. After releasing the bolt, the toggle is actuated to lower the slide or the slide moves down by gravity to the desired extent, and the slide is raised by actuation of the toggle mechanism. To this end, I show toggle links pivoted, at 90, to the lower end of the slide and, at 91, to the upper end of the toggle link 92, the latter being pivoted, at 93, to the frame or foundation and the pivotal connection 91 constituting the toggle joint. The joint 91 is moved to straighten or break the toggle by a link 94 pivotally connected, at one end, to the joint 91 and, at 95, to the bell crank 96 having the treadle 97.

While the overhanging or off-set form of work and die support may be used with flat work, it is preferable to use the form shown in Fig. 6, wherein the slide 74a has no off-set and carries the die at its top. The slide 74a has a slug or chip-discharge opening 98.

In both Figs. 1 and 6, the slides 74 and 74a, respectively, have the upper ends extending above the lower arm 12 and supporting the dies as well as constituting the work supports. Lowering of the slide in either form separates the work support and die so that work may be placed on or removed from the work support.

The ram, its guide construction, and the means for angularly adjusting the guide construction, as already pointed out, provide for the lower end of the ram being located quite close to the lower end of the guide construction, resulting in a strong and steady support for the ram and the tool carried thereby. My improved tool holder contributes in accomplishing this advantageous result more effectively in that the holder provides for connection of the tool to the ram with minimum overhang or distance of the cutting portion from the lower end of the ram; and, as the tool-connecting means does not protrude beyond the projected cylindrical surface of the ram both the lower end of the ram and the tool may be arranged quite close to the lower end of the guide construction. In Fig. 5, I show the ram 40 having a bore 100 for a tool holder 101 having a threaded connection 102 with respect to the bore. The holder has a bore 103 and a backing screw 104. The holder has staggered openings 105 intersecting the bore 103 and the tool is notched at 106 so that, when the notch is brought into registry with an opening 105 they complement each other to form an opening for the locking pin 107. As the tool is dressed or shortened, it may be lowered, upon removing the pin or key 107, and connected in a lowered position by inserting the pin in another opening 105 registering with the notch 106. In addition to this feature for lowering the tool, the ram may be raised or lowered by adjustment of the swivel ram screw 37. After adjustment of the tool with respect to the holder, if necessary, a filler block 108 is inserted between the backing screw 104 and the upper end of the tool. In order that the tool may be accurately centered with respect to the ram, the lower end of the holder cooperates with the lower end of the ram for centering the tool. For example, I show the lower end of the holder slotted at 109 and provided with a head 110 having an upper conical surface 111 cooperating with the conical surface 112 in the lower end of the ram. With a suitable wrench applied in the recess 113 in the holder, the latter may be screwed up to cause the split portions to exert a centering effect on the tool and to grip the latter. Hence, this tool connection provides for location of the cutting portion a minimum distance from the lower end of the ram, for accurate centering of the tool with respect to the ram and die, for lateral support of the tool in the holder, and for adequately strong stress transmitting connection. On working strokes, stress is transmitted from the ram to the holder and from the latter through the backing screw to the top of the tool. On back or stripping strokes, stress is transmitted from the holder through the pin 107 to the tool. The tool is rendered resistant to buckling on working strokes by the minimum overhang below the lower end of the ram and by the lateral support for the tool afforded by the holder particularly the split gripping portion thereof.

From the foregoing, it will be apparent that I have devised a nibbling machine capable of handling a variety of shapes; one in which looseness or play is eliminated; one in which the tool is strongly and steadily supported; one in which the tool is accurately centered and has its cutting portion located at a minimum distance below the ram and guide construction; one capable of variable cutting strokes; and one having means for angularly adjusting the tool and providing for the accomplishment of these advantages most effectively. The die is raised and lowered to the required extent to receive or permit removal of a shape, and the die support is so formed that a blank of complicated cross section may be accommodated. Looseness or play, so far as reciprocating motion is concerned, is taken up by the shims in the connections between the eccentric block and in the swivel connection between crosshead and the ram; and, looseness or play so far as cutting is concerned is taken care of by the bushing adjustment in the ram guide construction and by the bearing adjustment for the turret or head. The tool is strongly and steadily supported due to location of adjusting means for the ram guide construction and the ram above, whereby no complication on that account is introduced at the lower end of the ram and the tool is effectively supported with minimum overhang, and due to the strong bearing for the guide construction and the length of the direct connection of the bearing with the upper arm of the frame. Accurate centering of the tool follows from the adjustment features of the guide construction bearing and of the guide construction as well as the centering gripping connection between the lower end of the ram and the tool. The cutting portion of the tool is spaced below the ram a minimum distance because of the tool connection, the lower end of the ram may be located close to the guide construction because of the absence of adjustment mechanisms or key connections in that vicinity, and the tool is laterally supported by the holder, all to the end that buckling or deflection of the tool during cutting strokes may be avoided and proper relation with the die assured, the bearing and guide features also contributing to this end. Variation in cutting strokes may be had by changing eccentrics, eccentric shaft sections having eccentrics of differing eccentricities being interchangeable.

While I have shown one form of my machine with alternative die-supporting slides, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a cutting or slotting machine of the punch type, a frame having upper and lower arms, a vertical bearing carried by the upper arm, a head fitting the bearing and provided with a ram bore, a ram fitting the bore, a tool carried by the ram, a die cooperating with the tool and carried by the lower arm, an arm, means for clamping the arm to the ram above the head in any desired angular position, an upwardly-extending head projection, means providing a spline-like connection between the arm and the projection, and means for rotarily adjusting the head.

2. In a cutting or slotting machine of the punch type, a frame having upper and lower arms, a vertical bearing carried by the upper arm, a head fitting the bearing, and provided with a ram bore, a ram fitting the bore, means providing relative axial movement of the ram with respect to the head but preventing relative angular movement, a tool carried by the lower end of the ram, a die cooperating with the tool and carried by the lower arm, a gear disposed above the bearing and connected to the head, a pinion meshing with the gear, operating means for the pinion, and gripping means for holding the pinion in any desired position of adjustment.

3. In a cutting or slotting machine of the punch type, a frame having upper and lower arms and the upper arm being provided with a ram guide bore, a member angularly adjustable about the axis of the guide bore, a ram fitting the guide bore and having a tool holder bore coaxial with the ram guide bore, the lower end of the ram being disposed adjacent to the lower end of the guide bore, a slidable key connection between a portion of the ram above the ram guide bore and the angularly adjustable member, means for angularly adjusting said member, a tool holder fitting the ram tool holder bore and of smaller diameter throughout than the ram, a tool carried by the tool holder, centering means provided on the holder and on the ram and arranged within the cylindrical confines of the ram for centering the tool, and a die carried by the lower arm and cooperating with the tool.

4. In a cutting or slotting machine of the punch type, a frame having upper and lower arms, a split vertical bearing carried by the terminus of the upper arm and connected to the latter for its full length, a rotary head fitting the bearing and provided with a bore, a ram fitting the bore, means for tightening the bearing to remove looseness or play of the head with respect thereto, a tool carried by the ram, a die carried by the lower arm, and means for angularly adjusting the head.

5. In a cutting or slotting machine of the punch type, a frame; a vertical guideway carried by the frame; a crosshead fitting the guideway and including first and second members abutting horizontally and defining a horizontal groove, shims between the members, and screws for holding the members together; a block fitting the horizontal groove and provided with a bearing; a driving eccentric fitting the bearing; a ram guide carried by the frame; a ram fitting the ram guide; means for adjusting the ram about its longitudinal axis; the lowermost of said crosshead members being provided with a recess; a head carried by the ram, turnable in said recess and having upper and lower faces, the upper face being arranged to engage the bottom of said recess; a plate carried by the lowermost member of said crosshead and engaging the lower face of the head; shims between the plate and the lowermost member of the crosshead; screws for connecting the plate to the lowermost member of the crosshead; a tool carried by the ram; and a die carried by the frame and cooperating with the tool.

6. In a cutting or slotting machine of the punch type, a frame having upper and lower arms, means carried by the upper arm and provided with a ram bore, an angularly adjustable member carried by the upper arm, a ram fitting the bore and having its lower end arranged in close proximity to the lower end of the bore, a punch carried by the lower end of the ram, a die carried by the lower arm and cooperating with the punch, a key connection between a portion of the ram above the bore and the angularly adjustable member and providing for axial movement of the ram relative to the angularly adjustable member and preventing relative angular movement, means providing for angular adjustment of the key connection with respect to the ram, and means for adjusting the angularly adjustable member angularly.

7. In a cutting or slotting machine of the punch type, a frame having upper and lower arms, means carried by the upper arm and provided with a vertical ram guide bore, a punch carried by the ram and having a front cutting portion and a back pilot portion, a die cooperating with the punch and carried by the lower arm, a member carried by the upper arm and angularly adjustable about the axis of the ram and its guide bore, means for transmitting angular movement from said member to the ram including a slidable key connection the ram element of which is carried by the ram above the guide bore, means providing for securing the ram element of the slidable key connection in angularly adjusted position with respect to the ram, a pair of strippers carried by said member and having stripping portions adjacent to opposing sides of the pilot portion, means carried by said member and by the strippers and providing for vertical adjustment of the strippers and for holding them in adjusted positions, and means for rotarily adjusting said member.

8. In a cutting or slotting machine of the punch type suitable for making cuts from an edge or inside of a flanged or angular shape, an upper reciprocatory cylindrical punch having a depending pilot provided with lateral guide edges, a lower die having a cylindrical opening cooperating with the punch, a member elongated in the direction of motion of the punch and provided at its upper end with a holder for the die and the member including the holder having such limited dimensions horizontally with respect to the die that a flanged or angular shape may be accommodated for cutting with a flanged or angular portion extending downwardly alongside the member and the die holder provided thereon, means providing for movement of said member to lower the die from the punch a sufficient distance to permit of the insertion or removal of a shape between the punch and the die and to raise the die to bring the latter in cutting relation with respect to the punch, and means for turning the punch about its longitudinal axis to provide for cutting in various directions.

9. In a cutting or slotting machine of the punch type suitable for making cuts from an edge or inside a flanged or angular shape, a frame having upper and lower arms, a reciprocatory cylindrical punch carried by the upper arm and provided with a depending pilot having lateral guide edges, a die having a cylindrical opening cooperating with the punch, a vertical guide provided on the lower part of the frame, an elongated slide fitting the guide and provided at its upper end with a holder for said die, the die holder and die being normally spaced above the lower arm a sufficient distance and the slide including the die holder having such limited dimensions horizontally with respect to the die that a flanged or angular shape may be accommodated for cutting with a flanged or angular portion extending downwardly alongside the slide and the die holder provided thereon, means for moving the slide downwardly to separate the die from the punch a sufficient distance to permit the insertion or removal of a shape between the punch and the die and for moving the slide upwardly to bring the die into cutting relation with respect to the punch, and means for turning the punch about its longitudinal axis to provide for cutting in various directions.

10. In a cutting or slotting machine of the punch type suitable for making cuts from an edge or inside a flanged or angular shape, a frame having upper and lower arms, a reciprocatory punch carried by the upper arm, a die cooperating with the punch, a vertical guide provided on the lower part of the frame, a vertical slide fitting the guide and extending upwardly above the lower arm, a die holder secured to the upper end of the slide and having the die-holding portion thereof overhanging the slide, the die holder and the die being normally spaced above the lower arm a sufficient distance and the die holder having such dimensions horizontally with respect to the die and at least in the direction of overhang that a flanged or angular shape may be accommodated for cutting with a flanged or angular portion extending downwardly laterally of the overhanging portion, and means for moving the slide downwardly to separate the die from the punch a sufficient distance to permit the insertion or removal of a shape between the punch and the die and for moving the slide upwardly to bring the die into cutting relation with respect to the punch.

11. In a cutting or slotting machine of the punch type suitable for making cuts from an edge or inside a flanged or angular shape, a frame having upper and lower arms, a reciprocatory punch carried by the upper arm, a die cooperating with the punch, a vertical guide provided on the lower part of the frame, an elongated slide fitting the guide and provided at its upper end with a holder for said die, the die holder and die being normally spaced above the lower arm a sufficient distance and the slide including the die holder having such limited dimensions horizontally with respect to the die that a flanged or angular shape may be accommodated for cutting with a flanged or angular portion extending downwardly alongside the slide and the die holder provided thereon, means for moving the slide downwardly to separate the die from the punch a sufficient distance to permit the insertion or removal of a shape between the punch and the die and for moving the slide upwardly to bring the die into cutting relation with respect to the punch, said slide having a lateral recess, a movable bolt carried by the frame and fitting the recess when the die is in cutting position and serving to hold the die in the latter position, biasing means effective to move the bolt into the recess, and means for retracting the bolt from the recess incident to lowering the slide and the die carried thereby.

12. In a cutting or slotting machine of the punch type, a frame having upper and lower arms, means carried by the upper arm and provided with a ram bore, an angularly adjustable member carried by the upper arm, a ram fitting the bore and having its lower end arranged in close proximity to the lower end of the bore, a punch tool carried by the lower end of the ram and provided with a front cutting portion and a back pilot portion, a die carried by the lower arm and cooperating with the punch tool, a key connection between a portion of the ram above the bore and the angularly adjustable member and providing for axial movement of the ram but preventing angular movement thereof relative to the angularly adjustable member, and means for angularly adjusting the angularly adjustable member.

13. In a cutting or slotting machine of the punch type, a frame having upper and lower arms, means carried by the upper arm and provided with a vertical ram guide bore, a punch tool carried by the ram and having a front cutting portion and a back pilot portion, a die cooperating with the punch tool and carried by the lower arm, a member carried by the upper arm and angularly adjustable about the axis of the ram and its guide bore, means for transmitting angular movement from said member to the ram including a slidable key connection the ram element of which is carried by the ram above the guide bore, a pair of strippers carried by said member and having stripping portions adjacent to opposing sides of the pilot portion, means carried by said member and by the strippers and providing for vertical adjustment of the strippers and for holding them in adjusted positions, and means for adjusting said member angularly.

14. In a cutting or slotting machine of the punch type, a reciprocatory ram, a punch tool carried by the ram and having a front cutting portion and a back pilot portion, the back pilot portion having lateral guide edges, a die cooperating with the tool, means providing for turning of the ram and the tool carried thereby about the ram axis, a pair of strippers carried by said means and provided with stripping portions arranged adjacent to the guide edges, and means providing for adjustment of the strippers toward and away from the die and for holding them in adjusted positions.

In testimony whereof, I have hereunto subscribed my name this 27th day of September, 1930.

CHARLES B. GRAY.